(12) United States Patent
Leclercq et al.

(10) Patent No.: US 8,967,524 B2
(45) Date of Patent: Mar. 3, 2015

(54) HYDRAULIC CONTROL VALVE, A DEVICE FOR ADJUSTING BLADE PITCH, AND AN AIRCRAFT PROVIDED WITH SUCH A HYDRAULIC CONTROL VALVE

(71) Applicant: Airbus Helicopters, Marignane, Cedex (FR)

(72) Inventors: Maxime Leclercq, Talmont Saint Hilaire (FR); Bernard Gemmati, Lauris (FR); Philippe Veron, Saint Cannat (FR); Francois Malburet, Coudoux (FR)

(73) Assignee: Airbus Helicopters, Marignane Cedex (FR)

( * ) Notice: Subject to any disclaimer, the term of this patent is extended or adjusted under 35 U.S.C. 154(b) by 9 days.

(21) Appl. No.: 13/911,436

(22) Filed: Jun. 6, 2013

(65) Prior Publication Data

US 2014/0003941 A1 Jan. 2, 2014

(30) Foreign Application Priority Data

Jun. 28, 2012 (FR) ...................................... 12 01829

(51) Int. Cl.
*B64C 27/22* (2006.01)
*B64C 3/40* (2006.01)
*F15B 9/10* (2006.01)
*B64C 11/38* (2006.01)
*B64C 27/26* (2006.01)

(52) U.S. Cl.
CPC ... *B64C 3/40* (2013.01); *F15B 9/10* (2013.01); *B64C 11/38* (2013.01); *B64C 27/26* (2013.01)
USPC .............. 244/6; 244/60; 416/156; 416/157 R; 137/625.69

(58) Field of Classification Search
USPC ....................................................... 244/6, 60
See application file for complete search history.

(56) References Cited

U.S. PATENT DOCUMENTS 3,115,937 A * 12/1963 Biermann ....................... 416/46
3,198,212 A     8/1965 Junck et al.
(Continued)

FOREIGN PATENT DOCUMENTS

FR    1260746 A    5/1961
FR    1528300 A    6/1968
(Continued)

OTHER PUBLICATIONS

Search Report and Written Opinion; Application No. FR 1201829; dated Feb. 26, 2013.
(Continued)

*Primary Examiner* — Christopher P Ellis
*Assistant Examiner* — Medhat Badawi
(74) *Attorney, Agent, or Firm* — Brooks Kushman P.C.

(57) ABSTRACT

A hydraulic control valve (10) provided with at least one body (11) having a jacket (12) with a feed orifice (13). The hydraulic control valve (10) has a transfer rod (15) provided with at least one fluid transfer duct (16), at least one orifice (17) present inside the jacket (12), and a second orifice (18) arranged outside the jacket (12). The jacket (12) has a feed chamber (25) connected to said feed orifice (13) and a main fluid-return chamber (30) connected to discharge means (50) for discharging the fluid, control means (20) being secured to the jacket (12) in order to move the jacket (12) in translation relative to said transfer rod (15) so as to control the flow of fluid within said transfer rod (15).

13 Claims, 2 Drawing Sheets

(56) References Cited

U.S. PATENT DOCUMENTS

| | | | | |
|---|---|---|---|---|
| 3,219,121 | A * | 11/1965 | Barden | 416/154 |
| 3,261,406 | A * | 7/1966 | Goodman et al. | 416/35 |
| 3,263,754 | A * | 8/1966 | Belliere | 416/157 R |
| 3,647,320 | A * | 3/1972 | Chilman et al. | 416/157 R |
| 3,812,883 | A | 5/1974 | Yokokawa | |
| 4,028,004 | A * | 6/1977 | Wind | 416/157 R |
| 4,533,296 | A * | 8/1985 | Duchesneau et al. | 416/46 |
| 5,174,718 | A * | 12/1992 | Lampeter et al. | 416/48 |
| 5,186,608 | A * | 2/1993 | Bagge | 416/37 |
| 5,897,293 | A * | 4/1999 | Arel et al. | 416/46 |
| 6,513,752 | B2 * | 2/2003 | Carter, Jr. | 244/8 |
| 7,758,310 | B2 * | 7/2010 | Cotton et al. | 416/157 R |
| 8,061,992 | B2 | 11/2011 | Ferrier | |
| 8,376,269 | B2 | 2/2013 | Jalaguier | |
| 2002/0011539 | A1 * | 1/2002 | Carter, Jr. | 244/6 |
| 2008/0169379 | A1 * | 7/2008 | Cotton et al. | 244/60 |
| 2008/0289487 | A1 * | 11/2008 | Sequera et al. | 91/509 |
| 2009/0214344 | A1 * | 8/2009 | Ferrier | 416/156 |
| 2010/0133375 | A1 * | 6/2010 | Jalaguier | 244/6 |
| 2011/0164980 | A1 * | 7/2011 | Swift et al. | 416/153 |
| 2012/0134828 | A1 * | 5/2012 | Andersen et al. | 416/147 |
| 2012/0152195 | A1 * | 6/2012 | Schulze et al. | 123/90.17 |
| 2014/0202409 | A1 * | 7/2014 | Fujiwaki et al. | 123/90.15 |

FOREIGN PATENT DOCUMENTS

| | | |
|---|---|---|
| FR | 2927879 A1 | 8/2009 |
| FR | 2939098 A1 | 6/2010 |

OTHER PUBLICATIONS

Korean Notice of the Reason for Rejection Dated Oct. 24, 2014, Application No. 2013-0070437, Applicant Airbus Helicopters, 3 Pages.

\* cited by examiner

HYDRAULIC CONTROL VALVE, A DEVICE FOR ADJUSTING BLADE PITCH, AND AN AIRCRAFT PROVIDED WITH SUCH A HYDRAULIC CONTROL VALVE

CROSS REFERENCE TO RELATED APPLICATIONS

This application claims priority to French patent application No. FR 12 01829 filed on Jun. 28, 2012, the disclosure of which is incorporated in its entirety by reference herein.

BACKGROUND OF THE INVENTION (1) Field of the Invention

The present invention relates to a hydraulic control valve, to a device for adjusting blade pitch, and to an aircraft provided with such a hydraulic control valve.

More particularly, the invention relates to a rotary wing aircraft combining at reasonable cost the effectiveness in vertical flight of a conventional helicopter and the high travel speed performance that is made possible by using propulsive propellers and installing modern turboshaft engines.

The invention lies in particular in the technical field of hydraulic control valves for feeding an actuator for controlling the pitch of blades of a rotor.

(2) Description of Related Art

Conventionally, an aircraft has members that are controllable by a pilot, such as the blades of a lift rotor of a rotary wing aircraft or indeed the blades of a propeller.

Using flight controls, the pilot thus controls such members. Nevertheless, the force that needs to be delivered in order to move such members is sometimes very great. Consequently, the linkage connecting a flight control to a controllable member may be provided with a hydraulic system that is sometimes known as a "servo-control".

Such a hydraulic system has a power actuator co-operating with a hydraulic control valve, the hydraulic control valve being controlled via the flight control.

In conventional manner, an actuator is provided with at least one outer body in which a control piston moves in translation. The control piston may be provided with a power rod. Thus, each control piston defines a retraction chamber and an extension chamber inside each outer body.

Among the various types of actuator, there are single-body actuators having only one body in which a piston moves in translation.

There are also multi-body actuators, each provided with a plurality of bodies, each containing a respective control piston. It is common practice to use a double-body actuator in the field of aviation.

Furthermore, an actuator may be said to be a "single-acting" actuator or a "double-acting" actuator.

A single-acting actuator has a chamber fed with fluid by a hydraulic control valve. A single-acting actuator also has mechanical or electromechanical return means such as a return spring.

In order to move the piston relative to the body in a first direction, the hydraulic control valve feeds fluid to said chamber.

In contrast, in order to move the piston relative to the body in a second direction that is opposite to the first direction, the hydraulic control valve serves to discharge the fluid contained in said chamber. The return means then cause the piston to move in the second direction.

In contrast, a double-acting actuator proposes organizing a first chamber and a second chamber that are separated by a control piston. Each chamber can be fed with fluid by the hydraulic control valve. The travel direction of the piston relative to the body then depends on the fluid pressure in each of said first and second chambers.

In another aspect, an actuator may be an actuator having a stationary body. The actuator body is then fastened to a reference member. A hydraulic control valve can then cause the control piston of the actuator to move.

Conversely, the piston of an actuator may be fastened to a reference member, and a hydraulic control valve can then cause the body of the actuator to move. Such an actuator may be referred to as a "moving body actuator".

In order to connect the actuator to a hydraulic circuit, at least one hydraulic duct is secured to the body.

The combination of the hydraulic pressure that is usually to be found in the hydraulic duct and the movement of the duct during the movement of the moving body can lead to wear of the hydraulic duct.

Independently of the actuator variant, the actuator may co-operate with a hydraulic control valve.

The hydraulic control valve serves to control the quantity of fluid that is added to or taken from each chamber in the actuator.

A hydraulic control valve comprises a stationary jacket surrounding a movable spool, or indeed a fluid transfer rod connecting the hydraulic control valve to an actuator.

A pilot then controls the position of the spool in the jacket, e.g. in order to put a fluid feed orifice of the jacket into communication with a duct of said transfer rod.

Document FR 2 939 098 shows such a hydraulic control valve having a stationary jacket referred to as "body 23" and a movable spool referred to as "control spool 24".

Likewise, document FR 2 927 879 describes a control system for varying the pitch of a propeller and including a control valve having a spool. Under such circumstances, that document mentions a control valve having a spool that is movable in a body in compliance with the above-described prior art.

In order to control the pitch of the blades of an airplane propeller, a device is known that comprises a single-acting actuator arranged inside the hub of the propeller. The actuator has a hydraulic chamber co-operating with a piston that is connected to the blades of the propeller.

Since little space is available inside a hub, the actuator is controlled by a transfer rod of a hydraulic control valve, the hydraulic control valve conveying a fluid to the actuator in order to modify the pitch of the blades of the corresponding propeller.

The transfer rod has an outlet orifice that opens out into the hydraulic chamber of the actuator. The transfer rod is also secured to the piston.

Under such circumstances, the hydraulic control valve includes a jacket surrounding a spool. The spool is secured to a control rod that is connected to the flight controls.

Taking action on the flight controls causes the control rod to move, and consequently moves the spool of the associated hydraulic control valve.

As it moves, the spool of the hydraulic control valve allows fluid to flow from the jacket toward the hydraulic chamber via the transfer rod. The increase in pressure in the hydraulic chamber thus causes the piston to move and modify the pitch of the blades. Nevertheless, the movement of the piston also causes the transfer rod to move. The transfer rod is therefore no longer in register with the spool of the control valve, thereby making it possible to stop the movement of the piston.

Such a transfer rod is sometimes referred to as a "repeater" rod insofar as its position is representative of the position of the actuator piston.

Such a propeller control device is conventional in airplanes.

Nevertheless, it should be observed that the distance between the hydraulic control valve and the servo-control is considerable, thereby leading to non-negligible head loss.

Consequently, pitch variation control in the propeller takes place relatively slowly. Thus, the reaction time of the device, between a first moment when the pilot issues an order and a second moment when the order is transcribed, is relatively long.

Such slow control is not a problem for an airplane since the pitch of a propeller is controlled depending on the power of the airplane power plant. Since engine regulation takes place slowly, it is not troublesome for propeller pitch to vary slowly.

However, there also exist aircraft of another type having a rotary wing together with at least one propeller. That propeller may contribute to propulsion, but it also serves to provide the aircraft with yaw control.

In order to maneuver the aircraft in yaw, the pilot makes use of pedals, for example. Unfortunately, in order to respond to a gust of wind or in order to avoid an obstacle, the pilot may need to move the pedals quickly and through a large amplitude.

Since the hydraulic control valve and actuator assembly react slowly, the pilot's order runs the risk of not having any immediate effect.

Furthermore, such a device may also present one of the following drawbacks.

The great length of the transfer rod and the large number of parts mounted within one another lead to a large amount of static interdeterminancy. Furthermore, the spool and the transfer rod must move in translation in accurately parallel manner over a long distance. In spite of very severe dimensional and geometrical manufacturing tolerances, a certain amount of static interdeterminancy remains, with the corollary of a high level of friction.

In addition, the number and the dimensions of the surfaces that are in contact with one another and the degree of static interdeterminancy of the device can lead to high control forces.

In addition, the number of parts used tends to increase the probability of suffering an incident and also to increase the weight of the device.

Lubricating the device may also require a large flow rate of oil.

Document FR 1 260 746 shows a hydraulic control device for a marine propeller that has a spool referred to as a "control spool 6" that slides on a transfer rod under drive from control means.

The movable spool is arranged in a stationary body referred to as a "casing".

That document FR 1 260 746 does not form part of the technical field of the invention since it is concerned with a marine propeller, where a marine propeller is not subjected to the same constraints as a rotary wing aircraft.

It should also be observed that the spool slides along a fluid transfer rod and along a cylindrical rod given reference "19" that conveys fluid to the movable spool. That device is therefore statically interdeterminant. Furthermore, the device runs the risk of presenting considerable leakage, which may be difficult to accommodate in the context of an aircraft.

Document U.S. Pat. No. 3,812,883 describes a mechanism for preventing a valve from sticking. Grooves are formed in a drum, those grooves having a depth of less than 0.5 millimeters (mm). It should be recalled that grooves are not the same as tapping which, by definition, presents a screw thread.

Document FR 1 528 300 describes a valve having threaded lands for holding a spool hydrostatically in position inside its bore. That document also lies in a technical field that is different from that of the invention.

BRIEF SUMMARY OF THE INVENTION

An object of the present invention is thus to propose a hydraulic control valve of a new kind that seeks to avoid at least one of the above-mentioned drawbacks.

According to the invention, a hydraulic control valve has at least one body, each body comprising a jacket provided with a feed orifice suitable for being connected to a hydraulic circuit.

The hydraulic control valve has a transfer rod provided with at least one fluid transfer duct connecting at least one first orifice of the transfer rod present inside the jacket to at least one second orifice of the transfer rod, the first orifice being arranged inside the jacket and the second orifice being arranged outside the jacket. The transfer rod then performs rotary motion relative to the body.

The hydraulic control valve also has control means suitable for being connected to controls such as flight controls.

The hydraulic control valve is remarkable in particular in that each jacket has a feed chamber for feeding fluid to said transfer rod connected to the feed orifice, and a main fluid-return chamber connected to discharge means for discharging fluid from the hydraulic control valve, the control means being secured to each jacket so as to move the jacket in translation relative to the transfer rod in order to control the flow of fluid within the transfer rod. The fluid discharge means comprise a fluid recovery sump secured to each jacket.

The control means then move the or each jacket together with its sump in order to cause the first orifice to coincide with the fluid feed chamber, or with the main fluid-return chamber, or indeed with means for preventing fluid flow in order to put the system in an equilibrium condition.

Under such circumstances, the hydraulic control valve is provided with one jacket per body and with one transfer rod. The transfer rod is arranged in particular in a bore in each jacket. Such a bore thus constitutes interface means between a jacket and the transfer rod.

The transfer rod may also be connected to at least one piston of an actuator. The transfer rod may then be a transfer rod of known type. The transfer rod possibly constitutes a portion of means providing hydraulic connection between a stationary reference frame associated with the jacket and a rotary reference frame associated with a propeller, for example, as well as constituting means for repeating position.

Thus, the control means cause each jacket to move in translation relative to the transfer rod, and each jacket may for example feed fluid at least to one chamber of an actuator via the transfer rod. At least one piston of the actuator then moves, with that piston thus causing the transfer rod to move in translation relative to each of the jackets.

The relative movement of the transfer rod relative to a jacket causes the system to be brought into equilibrium, and the jacket no longer feeds fluid to the transfer rod.

Each jacket therefore moves in translation relative to the transfer rod.

It should be observed that the hydraulic control valve does not have a stationary jacket and a moving spool as in prior art devices, but on the contrary has a moving jacket. The hydraulic control valve can therefore respond quickly to a given order.

Furthermore, the forces needed to move the hydraulic control valve tend to be small.

By minimizing the number of moving parts, the invention makes it possible to limit the number of surfaces that are in contact with one another. This serves to minimize control forces.

This characteristic is advantageous. The control systems of a vehicle may include low-authority actuators that are fast and that are used in particular for stabilizing the vehicle. Minimizing control forces tends to reduce the probability of a fast actuator jamming in some position.

Furthermore, the hydraulic control valve is relatively simple and it makes use of a small number of mechanical parts.

The weight of the hydraulic control valve and its reliability can therefore be good.

Furthermore, lubrication of the hydraulic control valve can also be optimized. In particular, it is possible to lubricate the hydraulic control valve with a reasonable fluid flow rate at low pressure, e.g. about 40 bars, so as to maximize the lifetime of the flexible pipework feeding the jacket.

In addition, the fluid discharge means comprise one fluid recovery sump for each jacket. Each fluid-return chamber is open to the recovery sump of the body.

Such a recovery sump thus constitutes simple means for collecting fluid. In addition, the jacket does not move relative to its associated recovery sump, thereby making it possible to minimize any risk of leakage compared with a device that uses a spool that moves relative to a jacket and a fluid recovery sump.

The hydraulic control valve may also include one or more of the following characteristics.

By way of example, the hydraulic control valve is provided with a blocker device situated outside each jacket in order to block movement in rotation of each jacket relative to the transfer rod, so that rotation of the transfer rod does not lead to rotation of the jacket.

The transfer rod may optionally be secured to a propeller. The transfer rod then performs rotary motion within each jacket. The blocker device thus serves to ensure that the jacket is not constrained in rotation with the transfer rod.

Using a movable jacket makes it possible to arrange the blocker device outside the jacket. As a result no hydraulic leak can occur between the blocker device and the movable jacket.

The blocker device may include at least one abutment secured to an outside face of a jacket and to at least one guide rail situated outside each jacket and suitable for being fastened to a stationary reference member, the abutment being capable of sliding against the guide rail.

Furthermore, each jacket includes a bore in which the transfer rod moves, the bore extending between two ends, each closed in leaktight manner by a dynamic lip seal of the jacket.

The fluid is then better retained in the bore in order to avoid any leak to the outside.

At least one dynamic lip seal may be provided by a closure cap co-operating with the jacket.

Since the transfer rod can perform rotary motion inside the bore of the jacket, the feed chamber may optionally be annular in shape. This annular shape makes it possible to feed the transfer rod independently of the angular position of the first orifice.

Furthermore, within each jacket, the feed chamber is separated from the main fluid-return chamber by a separator ring of the jacket, the separator ring presenting clearance relative to the transfer rod. In addition, the separator ring presents a longitudinal separation dimension that is longer than a longitudinal transfer dimension of the first orifice, e.g. by about a few hundredths of a millimeter. The longitudinal transfer dimension of the first orifice may be the diameter of the orifice if the orifice is circular.

At equilibrium, the separator ring faces the first orifice to prevent fluid being transferred between the jacket and the transfer rod.

It should be observed that the clearance present between the separator ring and the transfer rod allows a leakage flow to occur between the main fluid-return chamber and the feed chamber. This leakage rate is limited by appropriately selecting the inside diameter of the bore in register with the separator ring, the outside diameter of the transfer rod, and the longitudinal separation dimension.

The difference between the longitudinal separation dimension and the longitudinal transfer dimension is a parameter set by the manufacturer in order to determine the dynamic behavior of the hydraulic control valve.

In addition, each jacket may include first tapping formed in an inside surface surrounding the transfer rod. The first tapping leads to the feed chamber, the first tapping having first threads directed towards the feed chamber.

The first tapping presents at least one of the following advantages.

By way of example, the first tapping can provide sealing of the feed chamber. Under the effect of the rotation of the transfer rod and the direction of the first threads, fluid present in the first tapping tends to return into the feed chamber.

In addition, the first tapping serves to lubricate the hydraulic control valve on starting.

The pressure of the fluid inside the hydraulic control valve is zero before starting. Fluid is discharged from the hydraulic control valve via the discharge means. Nevertheless, the first tapping tends to retain some of the fluid between its threads and the transfer rod. The resulting reserve of fluid provides lubrication on starting by creating a film of lubricant.

Finally, in operation, i.e. while the transfer rod is performing rotary motion, the first tapping constitutes a hydrodynamic bearing.

In addition, within each jacket, the hydraulic control valve may include a first secondary fluid-return chamber communicating with the discharge means, the first tapping extending from the first secondary fluid-return chamber towards the feed chamber.

This first secondary fluid-return chamber collects the fluid that might escape from the first tapping in order to direct it to a recovery sump. In addition, this first secondary fluid-return chamber makes it possible to avoid forming a pressurized jet that impacts against a dynamic seal.

Furthermore, each jacket may include second tapping arranged in an inside surface surrounding the transfer rod. The second tapping leads to the main fluid-return chamber, the second tapping having second threads directed towards the main fluid-return chamber.

The second tapping seeks in particular to provide the hydraulic control valve with lubrication on starting and to act as a hydrodynamic bearing.

Optionally, within each jacket, the hydraulic control valve includes a second secondary fluid-return chamber communicating with the discharge means, the second tapping extending from the second secondary fluid-return chamber towards the main fluid-return chamber.

Said hydraulic control valve may have a plurality of bodies, said transfer rod has one first orifice for each body. Each body includes a jacket having a fluid-feed chamber connected to a feed orifice and a main fluid-return chamber connected to fluid discharge means, the first control means being secured to each jacket in order to move each jacket in translation relative to said transfer rod.

The control valve then presents a low rate of failures that might cause the transfer rod to stick.

In addition to a hydraulic control valve, the invention also provides a device for adjusting the pitch of the blades of a propeller.

The pitch adjustment device may then include an actuator provided with at least one piston suitable for modifying said pitch. The pitch adjustment device includes a hydraulic control valve of the invention for feeding said actuator with fluid, a transfer rod of the hydraulic control valve feeding the actuator and being secured to each piston.

In addition to a hydraulic control valve, the invention also provides an aircraft having a fuselage and comprising:
a rotary wing arranged above the fuselage; and
an auxiliary lift surface provided with first and second half-wings extending on either side of the fuselage, at least one half-wing being provided with a propeller.

Each propeller is then controlled by an actuator fed by a hydraulic control valve of the invention, a transfer rod of the hydraulic control valve co-operating with the actuator.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements shown in more than one of the figures are given the same references in each of them.

DETAILED DESCRIPTION OF THE INVENTION

Figure 1:
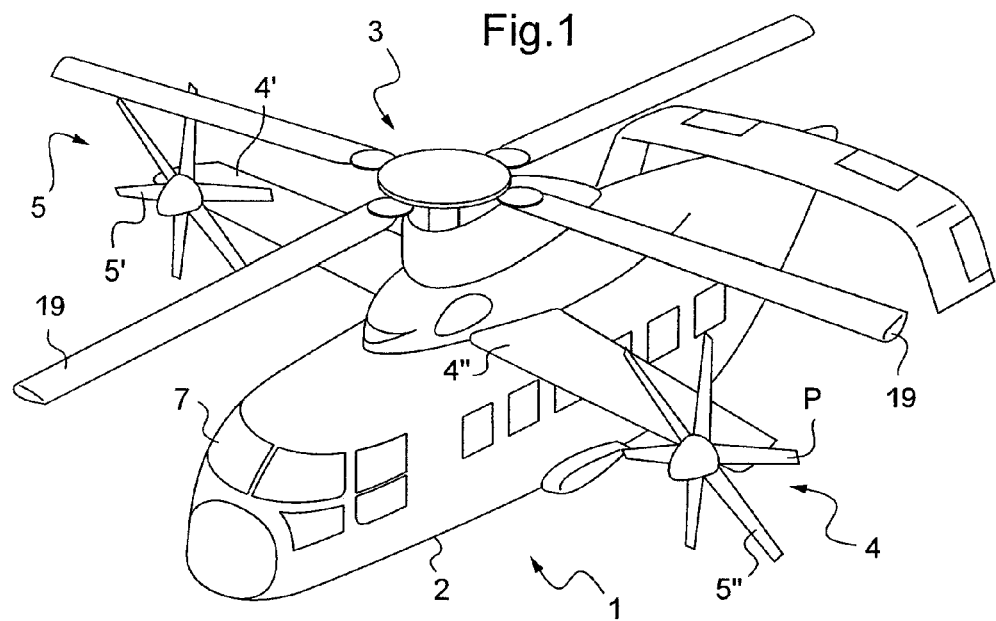
FIG. 1 shows a hybrid helicopter.

FIG. 1 shows a hybrid helicopter 1 having a fuselage 2 with a cockpit 7 at the front thereof.

The hybrid helicopter has a rotary wing 3 having main blades 19 that are driven in rotation by a power plant.

In addition, the hybrid helicopter 1 has a high wing 4 made up of two half-wings 4' and 4" arranged on the top of the fuselage 2.

The hybrid helicopter 1 also has at least one propeller 5. By way of example, it has first and second propellers 5' and 5" that are driven by the power plant and that are located at respective outer ends of the wing 4.

In the vicinity of the rear end of the fuselage, stabilizer and control surfaces are optionally also provided.

In order to control the pitch of the propeller blades, the hybrid helicopter has flight controls (not shown) and one hydraulic mover system per propeller. Each mover system includes a pitch adjuster device having a hydraulic control valve that feeds fluid to an actuator. The fluid may conventionally be oil.

Figure 2:
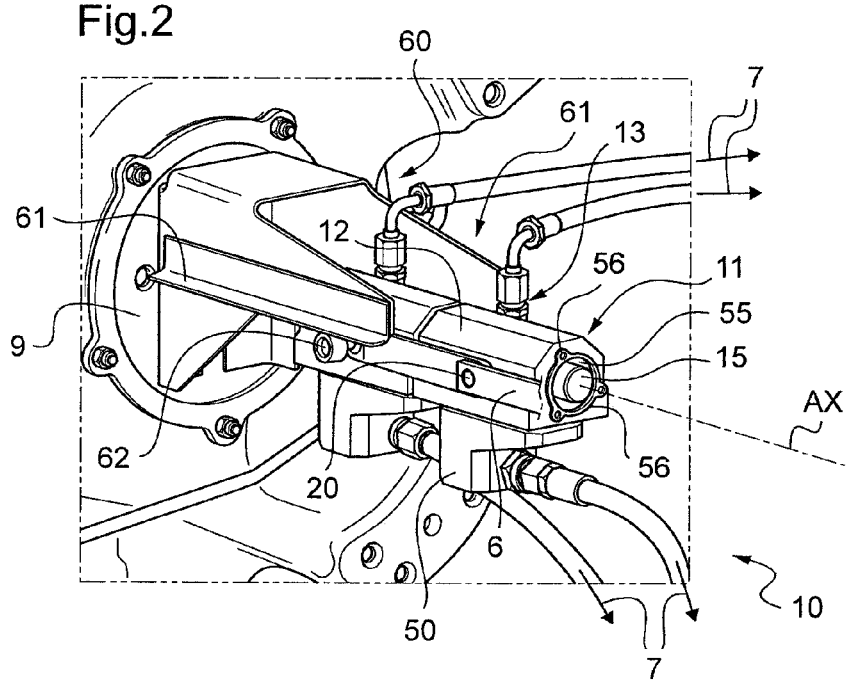
FIG. 2 is a diagrammatic three-dimensional view of a hydraulic control valve.
Figure 3:
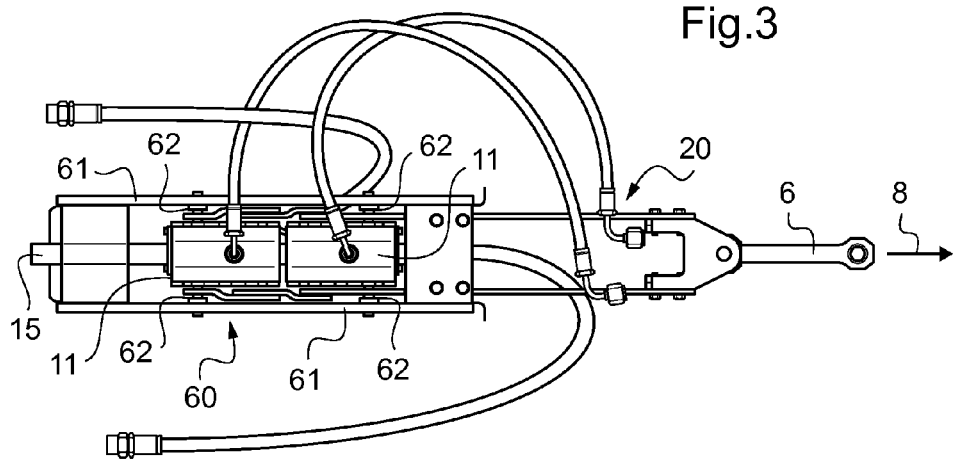
FIG. 3 is a diagrammatic plan view of a hydraulic control valve.

FIGS. 2 and 3 show a hydraulic control valve 10 of the invention.

With reference to FIG. 2 in particular, the hydraulic control valve 10 comprises at least one body 11 for transferring a fluid to a propeller. In the example shown, the hydraulic control valve 10 is a control valve having two bodies in tandem.

Each body 11 comprises a jacket 12. Each jacket 12 is secured to control means 20 that are connected via a linkage 6 to flight controls 8. The control means may include angle pieces fastened by conventional means to the jackets 12.

Furthermore, each jacket 12 has a feed orifice 13 connected to a hydraulic circuit 7 in order to be fed with fluid.

The hydraulic control valve is also provided with a transfer rod 15 projecting from the jacket of each body. Under such circumstances, each jacket has a bore (not visible in FIG. 2) with the transfer rod 15 passing therethrough.

In a control valve having two identical bodies in tandem, the transfer rod projects from the bore of a first body in order to penetrate into a second body. The transfer rod then penetrates from the bore of the second body in order to reach the propeller that is to be fed.

The transfer rod thus performs rotary motion together with the propeller.

In order to avoid this rotary motion being transmitted to the jacket of each body, the hydraulic control valve may include a blocker device 60.

The blocker device 60 may have at least one abutment 62 secured to each jacket 12, such as a wheel. Furthermore, the blocker device 60 is provided with at least one guide rail 61 fastened to a stationary reference member 9 of the vehicle.

For example, two guide rails are arranged in FIG. 2 for preventing the jacket from rotating about the axis of rotation AX of the transfer rod in clockwise and anticlockwise directions.

In normal operation, the transfer rod may rotate in one direction of rotation. However, a maintenance operation on the ground may require the transfer rod to be capable of rotating in both directions of rotation.

The blocker device 60 may thus have two rails in order to prevent the jackets from rotating about the axis of rotation AX of the transfer rod in either the clockwise direction or the anticlockwise direction.

Each abutment 62 is then free to move in translation along a guide rail 61, but is not free to move in rotation about the axis of rotation AX.

Figure 4:
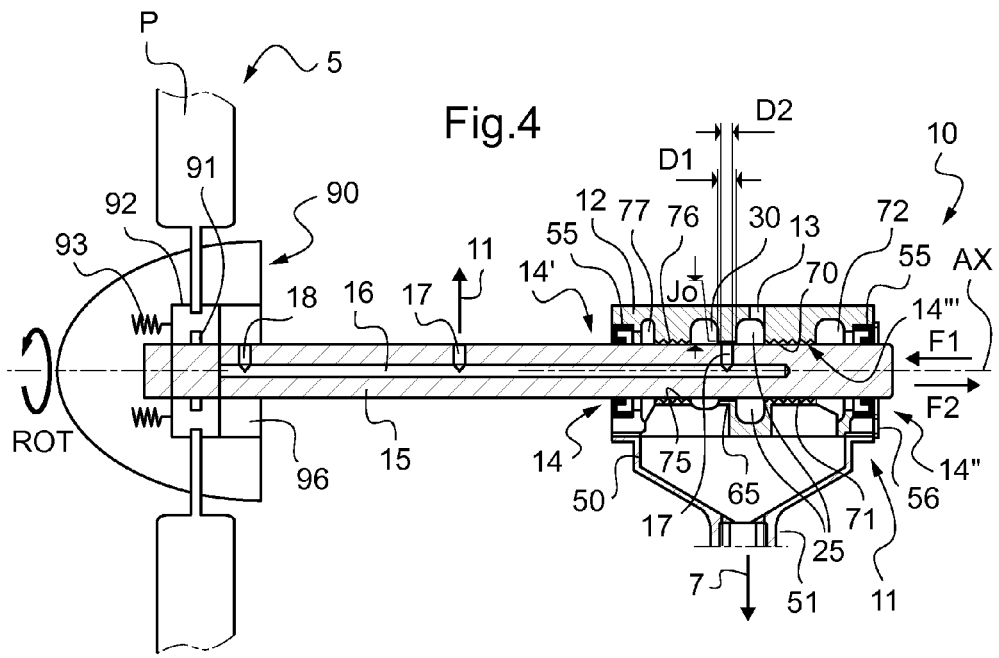
FIG. 4 is a section through an assembly including a hydraulic control valve and actuator.

With reference to FIG. 4, the transfer rod is provided with at least one fluid transfer duct 16.

In the example shown, the transfer rod may have a single duct for feeding a single chamber of a single-acting single-body actuator. However, it should be understood that other configurations can be envisaged without going beyond the ambit of the invention.

Each duct then defines at least a first orifice 17 of the transfer rod 15 and a second orifice 18 of the transfer rod 15. Each first orifice 17 is arranged within a jacket 12. In contrast, each second orifice 18 is arranged outside the jacket 12, e.g. in the hub of a propeller.

In the embodiment shown in FIG. 4, the transfer rod thus includes two first orifices and one second orifice. It should be observed that FIG. 4 shows only one body 11, for convenience, in order to facilitate understanding.

Furthermore, in order to avoid fluid leaking to the outside of the hydraulic control valve, the bore 14 in which the transfer rod 15 moves is closed in leaktight manner. The bore 14 extends between two ends 14' and 14", with each of the ends 14', 14" being closed in leaktight manner by a dynamic lip seal 55. A closure cap 56 may keep each dynamic seal 55 in position.

Each jacket also has a feed chamber 25. The feed chamber 25 communicates hydraulically with the feed orifice 13 of the jacket in order to convey fluid towards a first orifice of the transfer rod.

Since the transfer rod performs rotary motion ROT in operation, the feed chamber is preferably annular. Under such circumstances, the feed chamber may feed a first orifice independently of the angular position of the first orifice.

Each jacket also has a main fluid-return chamber 30 for discharging fluid that penetrates into the transfer rod 15 via a second orifice 18.

Under such circumstances, this main fluid-return chamber 30 is connected to fluid discharge means 50.

The discharge means 50 may comprise a fluid recovery sump 51 secured to each jacket 12.

Under such conditions, each jacket has a separator ring 65 arranged between the feed chamber 25 and the main fluid-return chamber 30 of the jacket.

This separator ring 65 presents clearance J0 relative to the transfer rod 15. In addition, the separator ring 65 has a longitudinal separation dimension D1 that is longer than a longitudinal transfer dimension D2 of the first orifice 17.

The jacket 12 as shown is also provided with first tapping 70. The first tapping 70 is made in the inside surface 14''' of the jacket surrounding the transfer rod 15.

The first tapping 70 also leads to the feed chamber 25, the first tapping 70 having first threads 71 that are directed towards the feed chamber 25.

Under such circumstances, the hydraulic control valve 10 possibly includes a first secondary fluid-return chamber 72, the first tapping 70 extending from said first secondary chamber 72 to the feed chamber 25.

The first secondary fluid-return chamber 72 is then open to the discharge means 50.

Likewise, the jacket 12 shown has second tapping 75 formed in the inside surface 14'''. This second tapping 75 leads to the main fluid-return chamber 30, the second tapping 75 having second threads 76 directed towards this main chamber 30.

The hydraulic control valve 10 may thus include a second secondary fluid-return chamber 77, the second tapping 75 extending from the second secondary fluid-return chamber 77 to the main fluid-return chamber 30.

The second secondary fluid-return chamber 77 is then open to the discharge means 50.

Furthermore, the transfer rod co-operates with an actuator 90 arranged in the hub of the diagrammatically-shown propeller 5.

This actuator includes a piston 92 that is suitable for moving along the axis of rotation AX. The piston 92 is also fastened to the blades P of the propeller 5, to a return device such as a return spring 93, and to the transfer rod 15 by means of a peg 91.

Thus, when the flight controls 4 move the control means 20 along the axis of rotation AX in the direction of arrow F1, the control means 20 move each of the jackets 12.

Each feed chamber is then open to a first orifice. As a result, fluid from the feed circuit 7 then penetrates into each jacket and then into the transfer rod 15.

The transfer rod 15 then conveys the hydraulic fluid to a chamber 96 of the actuator. The pressure inside said chamber 96 increases so as to move the piston 92 in translation.

Thereafter, the blades P of the propeller 5 are caused to swivel so as to vary their pitch.

The piston 92 also acts via its peg 91 to move the transfer rod 15. The movement in translation of the transfer rod 15 along the axis of rotation AX in the direction of the first arrow F1 serves to modify the position of the transfer rod 15 relative to the jacket 12. Each first orifice takes up a position in register with the separator ring.

Hydraulic fluid feed to the transfer rod 15 is thus stopped.

It should be observed that the position of the jacket is then representative of the position of the piston 92, and therefore of the pitch of the blades. The pitch of the propeller blades is thus a function of the position of each jacket of the hydraulic control valve.

In contrast, when the control means 20 are moved along the axis of rotation AX in the direction of arrow F2, the control means 20 move each of the jackets 12 so as to connect the transfer rod 15 to the main chamber 30.

The return spring 93 then moves the piston 92 along arrow F2. Consequently, the piston 92 exerts a force on the chamber 96 of the actuator 90. The hydraulic fluid present in this chamber 96 is expelled into the transfer rod 15 and then into the discharge means 50.

The relative movement of the piston is also accompanied firstly by a modification to the pitch of the blades P of the propeller 5 and secondly by a movement of the transfer rod 15 in translation in the second direction F2. The position of the transfer rod 15 relative to each jacket is modified once more, thereby enabling the expulsion of hydraulic fluid towards a hydraulic return circuit to be stopped. Each first orifice is once more positioned in register with the separator ring.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, the actuator described is a single-acting single-body actuator. Nevertheless, other types of actuator may co-operate with such a hydraulic control valve.

For example, the transfer rod may have two ducts for feeding two chambers of a single-acting double-body actuator.

What is claimed is:

1. A hydraulic control valve comprising:
    at least one body, each body comprising a jacket provided with a feed orifice suitable for being connected to a hydraulic circuit;
    a transfer rod with at least one fluid transfer duct co-operating with at least one first orifice of the transfer rod and at least one second orifice of the transfer rod, the first orifice being arranged inside the jacket and the second orifice being arranged outside the jacket, said transfer rod performing rotary motion (ROT) relative to said body; and
    control means suitable for being connected to controls, wherein each jacket has a feed chamber connected to said feed orifice and a main fluid-return chamber connected to discharge means for discharging the fluid, the control means being secured to each jacket in order to move each jacket in translation relative to said transfer rod in order to control the flow of fluid within said transfer rod, said fluid discharge means including a fluid recovery sump secured to each jacket.

2. A hydraulic control valve according to claim 1, wherein the hydraulic control valve is provided with a blocker device situated outside each jacket in order to block movement in rotation of each jacket relative to said transfer rod so that rotation of the transfer rod does not lead to rotation of each jacket.

3. A hydraulic control valve according to claim 2, wherein said blocker device includes at least one abutment secured to an outside face of a jacket and to at least one guide rail situated outside each jacket and suitable for being fastened to a stationary reference member, said abutment being capable of sliding against said guide rail.

4. A hydraulic control valve according to claim 1, wherein each jacket includes a bore in which said transfer rod moves, said bore extending between two ends each closed in leaktight manner by a dynamic lip seal of the jacket.

5. A hydraulic control valve according to claim 1, wherein the feed chamber is annular in shape.

6. A control valve according to claim 1, wherein, within each jacket, said feed chamber is separated from said main fluid-return chamber by a separator ring, said separator ring presenting clearance (J0) relative to said transfer rod, said separator ring presenting a longitudinal separation dimension (D1) that is longer than a longitudinal transfer dimension (D2) of said first orifice.

7. A hydraulic control valve according to claim 1, wherein each jacket includes first tapping formed in an inside surface surrounding said transfer rod, the first tapping leading to said feed chamber and having first threads directed towards said feed chamber.

8. A hydraulic control valve according to claim 7, wherein, within each jacket, said hydraulic control valve includes a first secondary fluid-return chamber communicating with said discharge means, said first tapping extending from the first secondary fluid-return chamber towards the feed chamber.

9. A hydraulic control valve according to claim 1, wherein each jacket includes second tapping arranged in an inside surface surrounding said transfer rod, the second tapping leading to said main fluid-return chamber and having second threads directed towards said main chamber.

10. A hydraulic control valve according to claim 9, wherein, within each jacket, said hydraulic control valve includes a second secondary fluid-return chamber communicating with said discharge means, said second tapping extending from the second secondary fluid-return chamber towards the main fluid-return chamber.

11. A hydraulic control valve according to claim 1, wherein said hydraulic control valve has a plurality of bodies, said transfer rod has one first orifice for each body, and each body includes a jacket having a feed chamber connected to a feed orifice and a main fluid-return chamber connected to discharge means, the first control means being secured to each jacket in order to move each jacket in translation relative to said transfer rod.

12. A device for adjusting the pitch of the blades of a propeller, wherein this pitch adjustment device includes an actuator having at least one piston suitable for modifying said pitch, the pitch adjustment device including a hydraulic control valve according to claim 1 for feeding said actuator with fluid, a transfer rod of the hydraulic control valve feeding the actuator and being secured to each piston.

13. An aircraft having a fuselage and comprising:

a rotary wing arranged above said fuselage; and an auxiliary lift surface provided with first and second half-wings extending on either side of said fuselage, at least one half-wing being provided with a propeller;

wherein in each propeller is controlled by an actuator fed by a hydraulic control valve according to claim 1, a transfer rod of said hydraulic control valve co-operating with said actuator.

* * * * *